United States Patent

Welch

[11] 4,178,047
[45] Dec. 11, 1979

[54] FURNITURE UNITS WITH CONCEALED FASTENERS AND METHOD THEREFOR

[75] Inventor: Montgomery J. Welch, East Grand Rapids, Mich.

[73] Assignee: Modular Systems, Inc., Fruitport, Mich.

[21] Appl. No.: 825,206

[22] Filed: Aug. 17, 1977

[51] Int. Cl.² .................. F16B 12/00; A47B 43/00
[52] U.S. Cl. .................. 312/140; 312/111; 312/257 R; 108/60; 52/36
[58] Field of Search .................. 312/257 R, 108, 140, 312/107, 111, 263; 108/60, 63, 152, 101; 211/90; 52/474

[56] References Cited

U.S. PATENT DOCUMENTS

| | | | |
|---|---|---|---|
| 1,759,178 | 5/1930 | Weldon | 108/63 |
| 3,110,934 | 11/1963 | Triplett | 20/3.5 |
| 3,247,332 | 4/1966 | McHugh | 312/245 |
| 3,265,344 | 8/1966 | Ornstein | 108/152 |
| 3,276,399 | 10/1966 | Canfield | 108/60 |
| 3,451,362 | 6/1969 | Ostling et al. | 108/60 |
| 3,491,820 | 1/1970 | Ostling | 52/474 |
| 3,592,344 | 7/1971 | Schade | 312/111 |
| 3,606,506 | 9/1971 | Ungaro | 312/111 |
| 3,634,983 | 1/1972 | Welch | 52/36 |
| 3,807,572 | 4/1974 | Luvara et al. | 312/108 |
| 3,869,992 | 3/1975 | Kramer | 312/257 R |
| 3,894,377 | 7/1975 | Welch | 52/584 |
| 3,996,718 | 12/1976 | Welch | 52/756 |
| 4,021,089 | 5/1977 | Bush | 312/111 |
| 4,055,373 | 10/1977 | Andresen et al. | 312/108 |

*Primary Examiner*—Victor N. Sakran

[57] ABSTRACT

The specification discloses a rigid furniture assembly and assembly method for providing shelving and the like wherein no fasteners or fastener-receiving openings are visible after assembly. The assembly includes joined panels having abutting joint surfaces lying in three mutually perpendicular planes. At least two parallel panels are secured to a perpendicular third panel, the two panels with the third attached thereto also being joined to parallel, commonly facing surface portions of a fourth panel. The panels are joined using pockets recessed in edges of the panels, which pockets receive slidingly engageable, recessed fastening means including slotted clips and headed, shouldered screws received in the clips. The panels slide together without the necessity of any bending or distortion such that all recessed pockets and fasteners are hidden after assembly.

28 Claims, 22 Drawing Figures

U.S. Patent    Dec. 11, 1979    Sheet 1 of 4    4,178,047
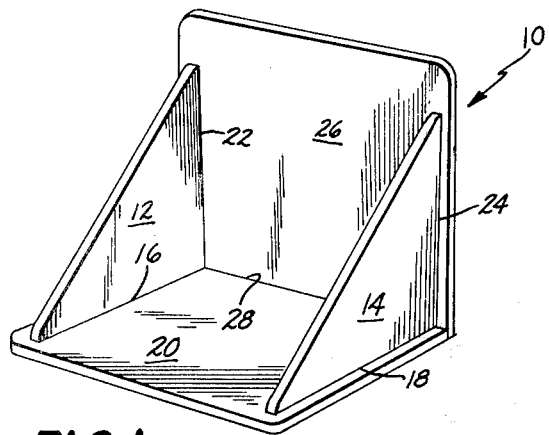
FIG.1.
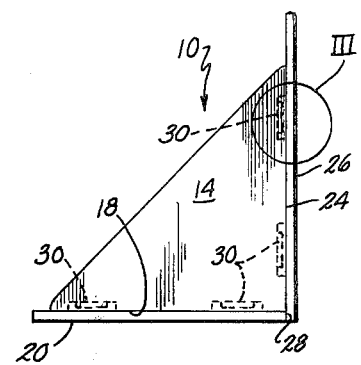
FIG.2.
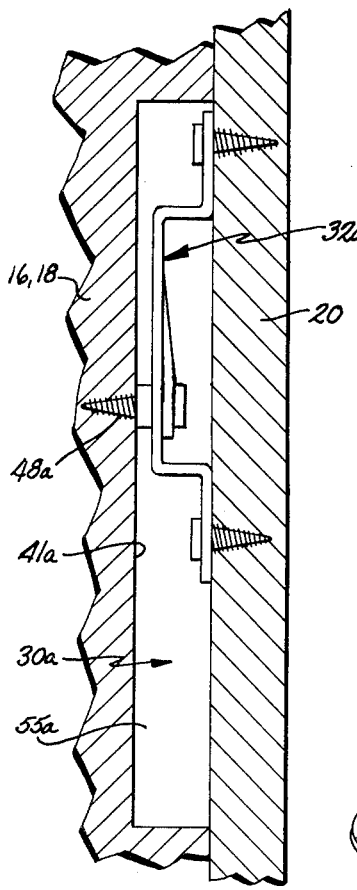
FIG.3A.
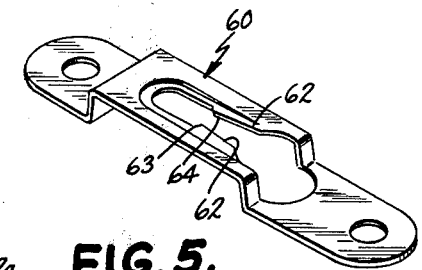
FIG.4.
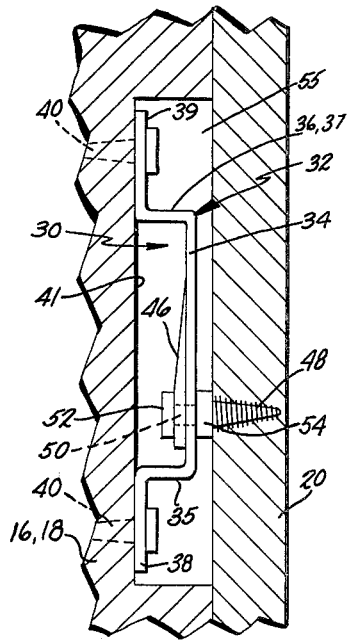
FIG.3.
FIG.5.
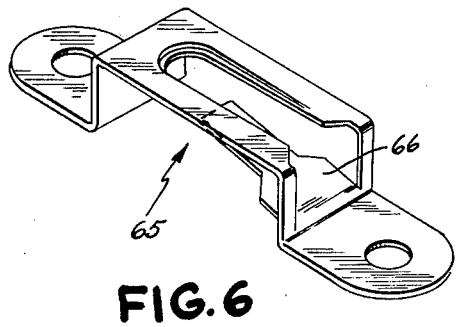
FIG.6

U.S. Patent  Dec. 11, 1979  Sheet 2 of 4  4,178,047
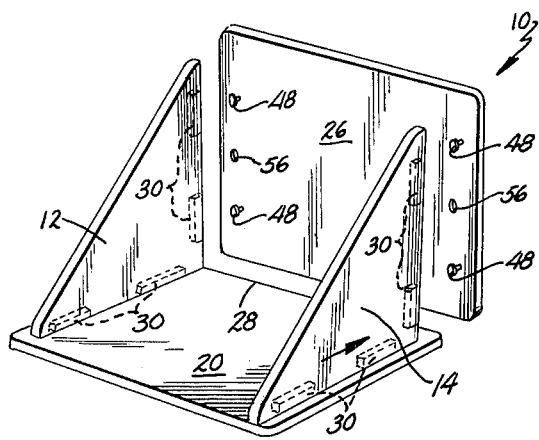
FIG. 7.
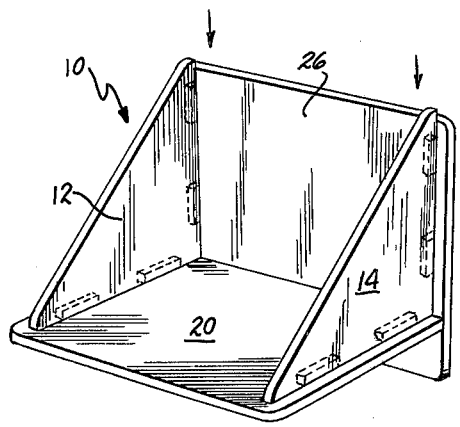
FIG. 8.
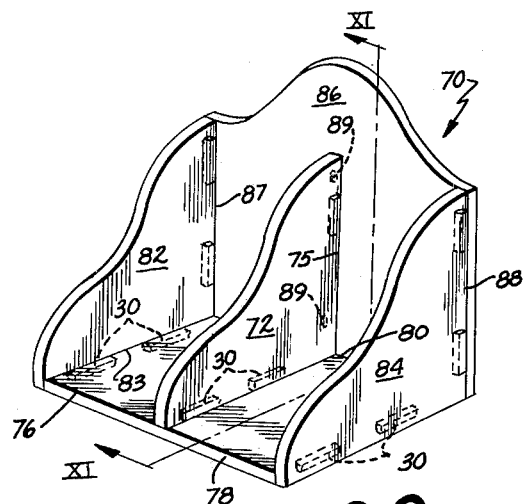
FIG. 9.
FIG. 10.
FIG. 11.

FURNITURE UNITS WITH CONCEALED FASTENERS AND METHOD THEREFOR

BACKGROUND OF THE INVENTION

This invention relates to furniture units which may be assembled from individual panels and, more particularly, to strong, rigid, furniture units which may be assembled from panels without bending or distortion of the panels and which contain no visible fasteners or fastener openings after assembly.

Many prior known furniture assemblies have utilized individual planar and panels of other configurations assembled together in edge-to-surface relationships to form three-dimensional furniture units. Such furniture includes conventional screws or nails passed through one panel and into another such that each panel is directly engaged and secured to other panels which it engages. For proper finishing, such constructions require careful covering and filing of nail and screw holes which are left after assembly.

In other furniture constructions such as those shown in U.S. Pat. No. 3,451,362 issued June 24, 1969, to E. J. Ostling et al entitled FURNITURE CONSTRUCTION HAVING YIELDABLE RECESSED FASTENING MEANS and U.S. Pat. No. 3,634,983 issued Jan. 18, 1972, to P. C. Welch entitled BOOTH CONSTRUCTION, which are commonly assigned to the owner of this application, specialized, vandal-proof assemblies such as for public telephone booths have been used wherein the various furniture panels are connected by recessed, slotted clips and headed screws received in such clips. Typically, the slotted clips are received in recesses in edge surfaces of one of the panels while the headed screw is received on the surface to be connected to the edge surface opposite to the slotted clip. In order to assemble three mutually perpendicular furniture panels in such prior constructions when utilizing the slotted clips and screws, it was found necessary to provide an opening or "window" from the recess in which the slotted clip was mounted outwardly through a surface adjacent the recess other than the surface in which the recess was made. This provided recess openings to two surfaces through which a screw head could be inserted and allowed assembly of various perpendicular panels by insertion of the screw heads through the "windows" into the recess containing the slotted clip even though some of the panels being connected were secured in a rigidly spaced relationship. In addition, it was sometimes necessary, as shown in U.S. Pat. No. 3,451,362, to bend outwardly and distort certain of the panels to insert the screw heads and their appropriate recesses for engagement with the slotted clips therein. This made disassembly difficult which was a desirable antivandalism feature of those specialized constructions.

For more conventional applications not requiring protection against vandalism, it became desirable to assemble a strong, rigid furniture unit having concealed fasteners and panels in three mutually perpendicular planes which were secured by slidingly engageable, recessed slotted clips. A furniture assembly and method was desired which did not require "windows" or openings into the recesses for assembly, did not require bending or distortion of the panels for assembly or disassembly, and contained no visible fasteners or fastener openings after assembly.

SUMMARY OF THE INVENTION

Accordingly, the present invention provides a strong, secure, rigid furniture unit assembly including panels joined in three mutually perpendicular planes to provide strength and which is assembled by means of flexible, resilient, recessed fasteners which urge the panels tightly together and yet are hidden and concealed after assembly is completed. The invention requires no bending or distortion of the panels for assembly and includes at least four panels, two of which are parallel to one another and secured to a perpendicular third panel. Parallel, commonly facing surface portions of a fourth panel are secured to other surfaces of the two parallel panels. The fourth panel is perpendicular to the other three panels. The parallel panels provide the only securement between the other two panels. The other two panels may abuttingly engage one another for support but are not directly connected themselves.

The invention also includes a furniture assembly method wherein two, parallel panels are slidably engaged with a third, perpendicular panel by means of slidably engageable, recessed fastening means. Other surfaces of the two parallel panels are thereafter slidably engaged with parallel, commonly facing surface portions of a fourth panel which is perpendicular to the remaining three panels. In the preferred embodiments, the parallel, commonly facing surface portions of the fourth panel are portions of a common planar surface.

The assembled furniture unit has no visible fasteners or fastener openings after assembly. Each joint between the directly connected panels includes a first portion of the slidably engageable fasteners secured to one panel and receiving a second portion thereof secured to the opposite panel. At least one of the abutting joint surfaces at each of the joints is a panel edge surface and includes a recessed pocket which opens only to its edge surface and not to any other surface of the respective panel. One portion of the slidably engageable fasteners is secured to the bottom surface of each of the recessed pockets while the other of the first and second portions is secured to the panel surface opposite each of the recessed pockets. Thus, the pockets are completely covered and hidden when the fastener portions are engaged and the panels are joined.

Preferably, the recessed fastening means include slotted clips engaged with headed, shouldered screws. Various embodiments may include other panels secured to one or more of the four basic panels. However, the basic arrangement of four panels, three of which are mutually perpendicular, is common to each embodiment.

The present furniture assembly is secure, strong and stable because of the inclusion of panels joined in three mutually perpendicular planes. All of the panels need not be directly interconnected with all of the other panels. The construction eliminates "windows" or openings leading to recesses in which recessed fasteners are placed which were previously necessary to make possible the joindure of panels in three mutually perpendicular planes. The assembly may be easily assembled and disassembled using certain types of the slotted fasteners. However, for permanent assembly, other, locking-type recessed fastening means may be used.

These and other objects, advantages, purposes and features of the invention will become more apparent from a study of the following description taken in conjunction with the drawings.

BRIEF DESCRIPTION OF THE DRAWINGS

FIG. 1 is a perspective view of a first embodiment of the furniture assembly of the present invention;

FIG. 2 is a right side elevation of the furniture assembly shown in FIG. 1;

FIG. 3 is an enlarged, sectional view of the flexible, resilient, slidably engageable, recessed fasteners joining the panels of the present invention taken in area III of FIG. 2;

FIG. 3A is an alternate arrangement of the recessed fasteners wherein the slotted clip is secured opposite the recessed pocket which includes the headed screw;

FIG. 4 is a perspective view of one of the slotted, resilient, flexible clips preferably used to assemble the present furniture assembly;

FIG. 5 is a perspective view of an alternate embodiment of the slotted clip for assembling the present invention;

FIG. 6 is a perspective view of yet another slotted clip used for permanent assembly of the present invention;

FIG. 7 is a perspective view of the furniture assembly of FIG. 1 during assembly;

FIG. 8 is a perspective view of the final assembly step for the furniture assembly of FIG. 1;

FIG. 9 is a perspective view of a second embodiment of the furniture assembly of the present invention;

FIG. 10 is a right side elevation of the assembly shown in FIG. 9;

FIG. 11 is a sectional view of the furniture assembly of FIGS. 9 and 10 taken along lines XI—XI of FIG. 9;

DESCRIPTION OF THE PREFERRED EMBODIMENTS AND METHOD

Figure 18:
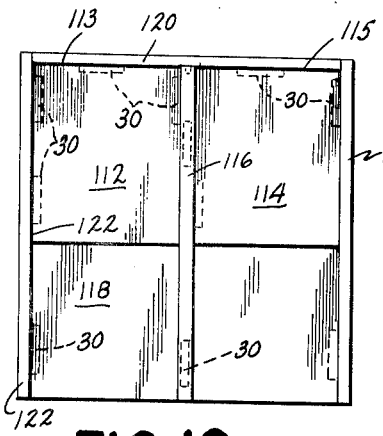
FIG. 18 is a top view of the furniture assembly shown in FIGS. 15-17.
Figure 17:
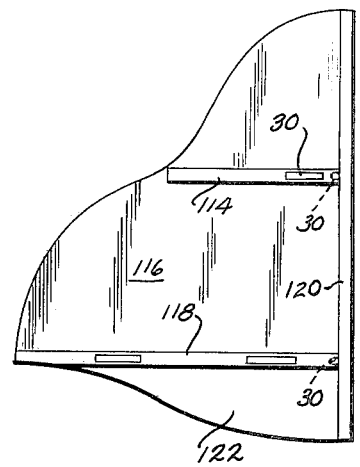
FIG. 17 is a sectional view of the assembly shown in FIGS. 15 and 16 taken along lines XVII—XVII of FIG. 15.
Figure 16:
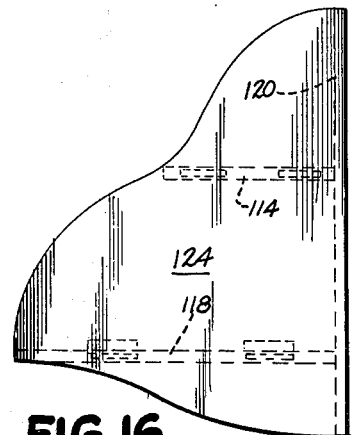
FIG. 16 is a right side elevation of the furniture assembly of FIG. 15.

Referring now to the drawings in greater detail, FIGS. 1, 2, 7 and 8 illustrate a first embodiment 10 of the furniture unit assembly of the present invention. The assembly includes a minimum of four separate structural panels cut in various configurations preferably from planar sheets of pressed particle board, plywood, or other woods. Metal panels could also be used. For decorative purposes, each of the panels may be covered with a veneer of walnut, cherry or other wood or a synthetic layer simulating such wood or other designs or colors. In addition, the edge surfaces of each of the panels may be covered with a wood grain tape or the like to complete the decorative effect.

As shown in FIGS. 1, 2, 7 and 8, each of the four planar panels includes opposite side surfaces and at least three edge surfaces. At least three of the four panels lie in mutually perpendicular planes. Alternately, the panels are joined at abutting joint surfaces which lie in three mutually perpendicular planes even though the panels themselves could be curved or otherwise configured. In assembly 10, two triangularly shaped planar panels 12 and 14 are each connected by rectilinear, planar edge surfaces 16, 18, respectively, to one surface of a third panel 20. Since panel 20 also is planar and panels 12 and 14 are perpendicular to that panel, panels 12 and 14 are also parallel. In turn, edges 22, 24 of panels 12 and 14, respectively, are connected to a common surface of a fourth panel 26. Since edges 22, 24 are perpendicular to edges 16, 18 and panel 20, and are also parallel, panel 26 is secured in a mutually perpendicular relationship to panels 12, 14 and 20. Rear edge surface 28 of panel 20 abuttingly engages a side surface of panel 26 although panels 20 and 26 are not directly connected. The only connection between panels 20 and 26 is via panels 12 and 14. Because of the attachment to the common surface of panel 26 and the lack of direct securement between panels 20 and 26, the four-panel assembly 10, in which some of the panels lie in at least three mutually perpendicular planes, is possible. After assembly, the fasteners for the various panels are hidden and concealed as will be more fully described hereinafter.

As is shown in FIGS. 2–4, each of the panels 12, 14 is respectively connected to panels 20, 26 by recessed, slidably engageable, flexible, resilient fasteners. Each of the panels edges 16, 18, 22 and 24 include two spaced rectangular recessed pockets 30 which are formed by routing or other methods and include a slotted fastening clip 32 secured completely therewithin. In the drawings, each recessed pocket 30 in all of the various embodiments will be understood to include a portion of the recessed fasteners. See FIGS. 3 and 3A.

Clip 32 is of the type described in U.S. Pat. No. 3,491,820, issued Jan. 27, 1970, to E. J. Ostling, entitled FLEXIBLE JOINT STRUCTURE AND CLIP THEREFOR, commonly assigned to the assignee of the present application, the disclosure of which is incorporated by reference herein. As shown in FIG. 4, clip 32 includes a raised, central section 34 supported by legs 35, 36 and 37 above securing flanges 38, 39 by which the clip is secured by screws 40 to the bottom 41 of recess 30. A slot 42 having a closed end 43 is formed longitudinally in raised section 34 and provided with an opening entrance 44 between legs 36, 37. The sides of slot 42 are offset below section 34 to form wedging surfaces 46 which draw the head of a screw received in the slot 42 downwardly as described hereinafter. On the panel surface opposite each pocket 30 in assembly 10 are secured headed, shouldered screws 48 including a shaft 50 terminating in a head 52 projecting above the surface to which the screw is attached and a shoulder 54 spaced inwardly from the head 52 which determines the depth to which the screw is inserted in the panel.

Referring again to FIGS. 7 and 8, the two pockets 30 in each of the edges 16, 18 of panels 12 and 14 are parallel to one another and include slotted clips 32 which are parallel to one another and have their closed slot ends 43 extending away from rear edge 28 of panel 20. Shouldered screws 48 are secured to the surface of panel 20 at appropriate aligned, spaced positions for engagement with the slotted clips in recessed pockets 30. Each panel 12, 14 is placed over the shouldered screws with the projecting shaft and head of screw 48 received in areas 55 of the pockets as shown in FIG. 3. Each panel is then pushed rearwardly toward edge 28 (FIG. 7) causing the screws to enter slots 42 through openings 44, engage wedging surfaces 46 and draw panels 12, 14 and 20 tightly together as shown in FIG. 3. The flexible resiliency of the metal from which clip 32 is formed continues to urge the panels tightly together continuously after assembly as is described in U.S. Pat. No. 3,491,820. In FIG. 7, panel 12 is shown in its assembled position while panel 14 is shown during disengagement with panel 20.

Thereafter, the subassembly including panels 12, 14 and 20 wherein edges 22, 24 of panels 12 and 14, respectively, are parallel and flush with rear edge 28, is secured to the common surface of panel 26 which includes shouldered screws 48 positioned appropriately therein and aligned parallel to the edges 22, 24. The panel assembly with panels 12, 14 and 20 is placed over screws 48 on panel 26 and urged downwardly engaging the screws with the recessed clips 32 to draw panels 12 and 14 tightly against panel 26. Clips 32 in the recessed pockets 30 in panel edges 22 and 24 have their closed ends extending upwardly away from panel 20. Since the assembly 10 may be appropriately used as a wall shelf, panel 26 may be secured to a wall or other vertical surface using screws inserted through apertures 56 prior to assembly with panels 12 and 14. Apertures 56 are located in line with shoulder screws 48 such that they are hidden from view after panels 12 and 14 are assembled to panel 26. The surface portions of panel 26 to which panels 12 and 14 are secured are parallel to one another and face in the same direction. Headed screws 48 on panel 26 are all parallel to one another and project in the same direction. Hence, panels 12 and 14 may be simultaneously assembled with panel 26 as shown in FIG. 8 avoiding any necessity of bending or distorting panels 12 and 14 for assembly with panel 26 yet allowing the finished assembly to include panels in three mutually perpendicular planes.

After assembly, assembly 10 is rigid, strong and secure. Inasmuch as panel 20 must be slid toward its edge 28 to be removed from panels 12 and 14 and its rear edge 28 engagingly abuts panel 26, the entire assembly cannot be disassembled until panels 12 and 14 are disconnected from panel 26. Also, none of the pockets 30, or fasteners 32 or 48, or even the wall securing apertures 56 are visible after the assembly is complete. All of the fasteners and pockets are hidden between the abutting joint surfaces between the edges of one panel and the surfaces of the opposing panel.

Alternately, as shown in FIG. 3A, a slotted clip 32a may be secured to the planar surface of a panel in opposition to a recessed pocket 30a of greater length than pocket 30. A headed, shouldered screw 48a is secured to the bottom of pocket 30a. When panel 16 or 18 is placed over panel 20, the raised section of clip 32a is received in area 55a of pocket 30a and the panels are slid with respect to one another to bring screw 48a into engagement with the slot of clip 32a.

Other types of slotted clips may also be used depending on the permanency of assembly desired. As shown in FIGS. 5 and 6, one alternate type of slotted clip 60 is of the type described and claimed in commonly assigned U.S. Pat. No. 3,894,377, issued July 15, 1975, to Russell M. Welch, entitled FASTENER CLIP, the disclosure of which is incorporated by reference herein. Such clip is similar in all respects to clip 32 except that it includes slot sides 62 which taper toward a minimum width slot portion at points or locking areas 63, 64. The width between points 63, 64 is slightly less than the size of the shaft of headed screw 48 between head 52 and shoulder 54. Sides 62 of the slot flex outwardly when the screw is slid therethrough to allow passage of the screw to the closed end of the slot. Points 63, 64 resist withdrawal of the screw shaft until a predetermined force is applied.

As shown in FIG. 6, alternate clips 65 may also be used for permanent assembly of the furniture units. Clip 65 is similar in all respects to clip 32 but includes a rectilinear locking flange 66 extending upwardly from the lower edge of slot opening 44 toward the slot 42. As the screw is moved through the slot, it urges flange 66 downwardly until the screw reaches the closed end of the slot. Thereafter, the flange 66 springs back upwardly to engage the head or shaft of the screw and prevent withdrawal of the screw unless the flange is depressed. Clip 65 is of the type described and claimed in commonly assigned U.S. Pat. No. 3,491,820, mentioned above and incorporated by reference herein.

Referring now to FIGS. 9–11, a second embodiment 70 of the furniture unit is shown. Assembly 70 includes five separate planar panels, four of which have decoratively curved edges which are free after assembly. A generally triangular panel 72 including two pockets 30 in lower edge 74 is slidably connected via recessed fasteners as described above in connection with FIGS. 3, 3A and 4–6 to the center of the bottom panel 76 such that panel 72 is perpendicular to panel 76 and edge 78 of panel 76. The rear edge 75 of panel 72 is flush with the rear edge 80 of panel 76. Panels 82 and 84 are next secured to the opposite end edges 83, 85 of panel 76. The slotted clips connecting panels 72, 82 and 84 to panel 76 all have their closed ends directed away from rear edge 80.

After assembly of panels 72, 76, 82 and 84, panels 72, 82 and 84 are slidably engaged with the common front surface of a rear panel 86 by means of recessed fasteners received in recessed pockets 30 in the rear, parallel, vertical edges 75, 87 and 88 of panels 72, 82 and 84 respectively. Panel 86 may be secured to a wall prior to attachment of panels 72, 82 and 84 via fastener apertures 89 (FIG. 9) which are concealed under edge 75 after final assembly. Panels 72, 82 and 84 are simultaneously secured to panel 86 by sliding in a single direction which is enabled by their connection to the same surface of panel 86. As with assembly 10, panels 72, 82 and 84 provide the only connection between panels 76 and 86 after assembly and all recessed pockets and fasteners are hidden and concealed from view after such assembly. No additional openings to pockets 30 are necessary.

Figure 12:
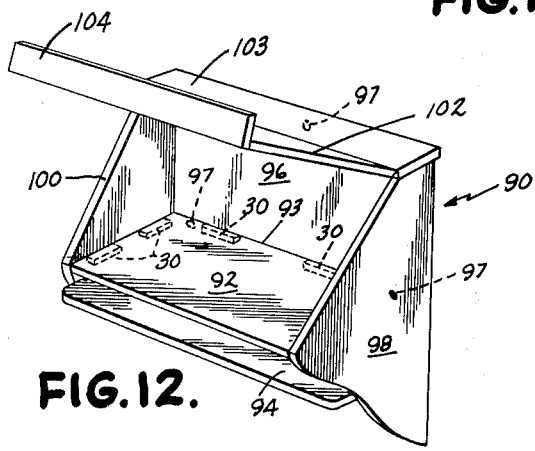
FIG. 12 is a perspective view of a third embodiment of the furniture assembly of the present invention.
Figure 13:
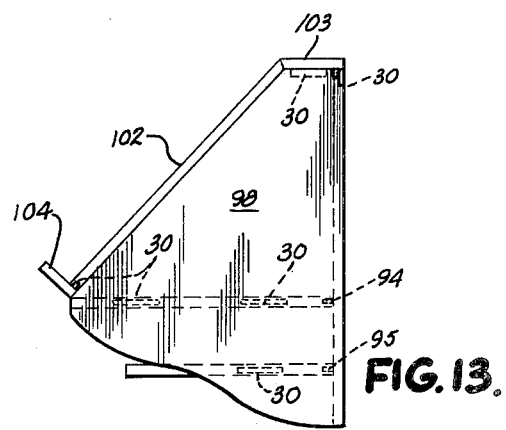
FIG. 13 is a right side elevation of the furniture assembly of FIG. 12.
Figure 15:
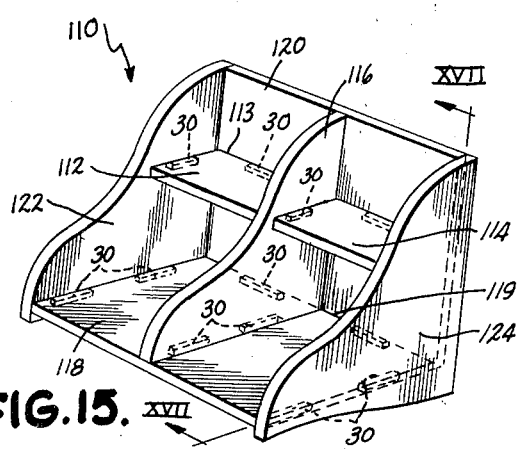
FIG. 15 is a perspective view of a fourth embodiment of the furniture assembly of the present invention.
Figure 14:
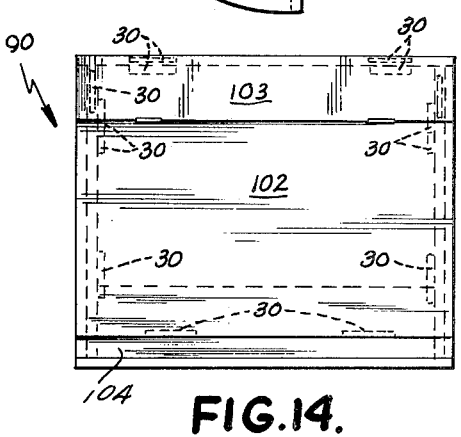
FIG. 14 is a top view of the furniture assembly shown in FIGS. 12 and 13.
Figure 20:
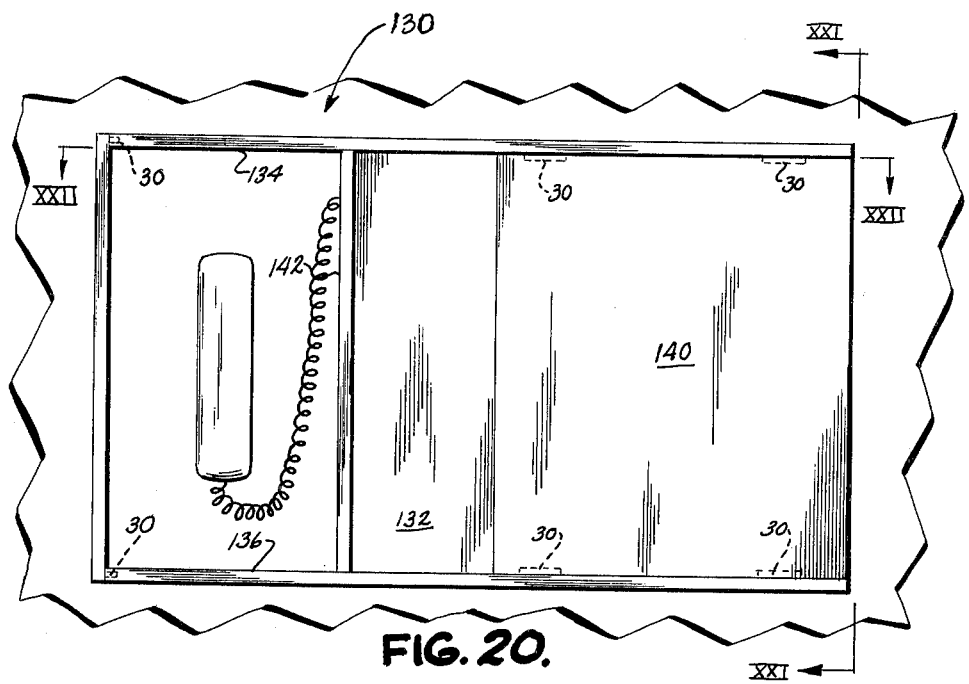
FIG. 20 is a front elevation of the assembly shown in FIG. 19.

As shown in FIGS. 12–14, a third embodiment 90 of the furniture assembly is shown. Each of two horizontal panels 92, 94 are secured by a pair of recessed fasteners on each panel rear edge 93, 95, respectively, to a third vertical panel 96. Panel 96 is secured to a wall as in assembly 10 via fasteners through openings 97 in panel 96 (FIG. 12). Each of the recessed pockets 30 includes recessed fasteners as described above in connection with FIGS. 3, 3A and 4–6. Other edges of panels 92 and 94, which are perpendicular to rear edges 93 and 95, are secured to fourth and fifth panels 98 and 100 by means of a pair of recessed pockets 30 and fasteners in each of the other edges of panel 92 and a single recessed pocket 30 and fastener in the other edges of panel 94 because of the cut-away of the lower edge of panels 98, 100. Prior to assembly of panels 98 and 100, a panel 102 having another panel 104 secured at a right angle to its lower edge by means of a pair of recessed pockets 30 and fasteners in the lower edge of panel 102 is secured to an edge of another panel 103. Panel 103 is secured to the upper edge of rear panel 96 by means of a pair of recessed pockets 30 and fasteners in panel 96 as shown in FIG. 14. Panels 98 and 100 are then positioned with the headed screws from panels 103 in a recessed pocket formed in the upper edge of panels 98 and 100, and the headed screws from the inside surfaces of panels 98 and 100 in the recessed pockets 30 formed in the side edges of panels 92 and 94, and slid rearwardly past the side edges of panel 96 to complete the assembly. The downwardly angled edges of panels 98, 100 are parallel and aligned and support the hinged panel 102 in its down or closed position as shown in FIG. 13. Again, as with panels 10 and 70, no pockets or recessed fasteners are visible in the assembly when completed. The fasteners in the top edges of panels 98 and 100 prevent the lateral removal of panel 103 while the side surfaces of panels 98 and 100 prevent the removal of panels 92, 94 and 96 until the panels 98 and 100 are themselves removed.

A fourth embodiment 100 of the assembly is shown in FIGS. 15-18. This assembly includes panels 112 and 114 which are first secured to opposite sides of a panel 116 perpendicular thereto by means of single recessed pockets 30 and fasteners in inside edges of panels 112, 114. Next, panel 118 is slidably secured to the bottom edge of panel 116 by a pair of recessed pockets 30 and fasteners in the bottom edge of panel 116. The subassembly of panels 112, 114, 116 and 118 is slidably secured to the common, forward facing surface of panel 120 by means of a pair of spaced, recessed pockets 30 and fasteners therein in the rear edge 119 of panel 118 and single recessed pockets 30 and fasteners in each of the rear edges 113 and 115 of panels 112 and 114, respectively. This sliding attachment is made by sliding the assembly parallel to the top and bottom edges of rear panel 120. Panel 120 may first be secured to a wall via fastener openings 121 (FIG. 15) which are covered by edges 113, 115 of panels 112, 114 after assembly. Assembly 110 is completed by securing sixth and seventh panels 122 and 124, respectively, to the end edge surfaces of panels 112, 114 and 118 by means of recessed pockets 30 in those end edges as shown in FIGS. 15-18. Panels 116, 120, 122 and 124 are secured together only by means of panels 112, 114 and 118 and contain no direct connections therebetween. Panels 122, 124 are slid rearwardly past the side edges of panel 120 so that they are flush with the rear surface thereof and prevent removal of panel 120 until sides 122, 124 are themselves removed. Again, no recessed pockets 30 or fasteners are visible after assembly of unit 110. Each of the end edges of panels 112, 114 requires only a single recessed pocket and fastener therein. These panels are stabilized by offsetting the positions of these pockets on the end surfaces as shown in FIG. 18.

Figure 22:
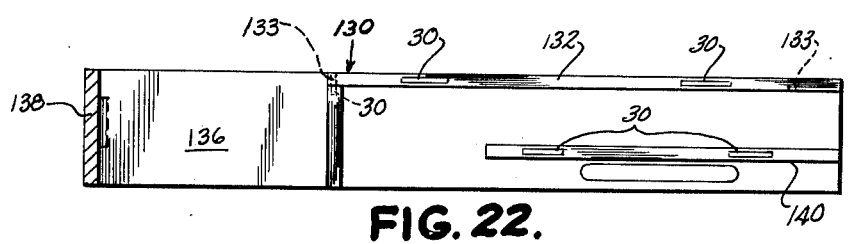
FIG. 22 is a sectional, plan view of the assembly shown in FIGS. 19-21 taken along lines XXII—XXII of FIG. 20.
Figure 19:
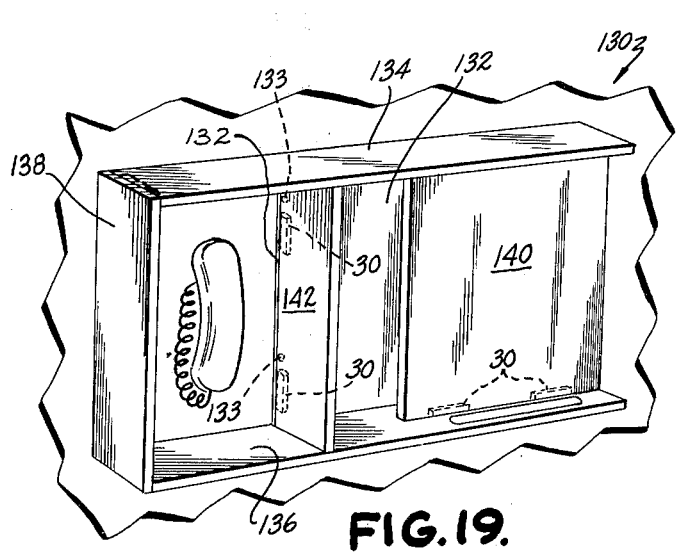
FIG. 19 is a perspective view of a fifth embodiment of the furniture assembly of the present invention.
Figure 21:
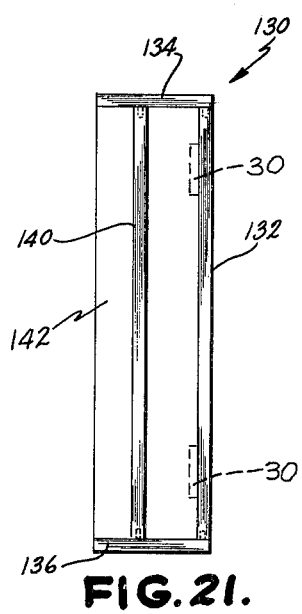
FIG. 21 is an end elevation of the assembly shown in FIGS. 19 and 20 and taken along plane XXI—XXI of FIG. 20.

A final embodiment 130 of the assembly is shown in FIGS. 19-22. A back planar panel 132 is secured to a wall or other surface via fastener apertures 133 (FIGS. 19, 22). A pair of elongated panels 134, 136 are secured perpendicularly to panel 132 to the parallel top and bottom edges of panel 132 each by a pair of spaced recessed pockets 30 and recessed fasteners as described above. The left end surfaces of panels 134, 136 each contain a recessed pocket and recessed fastener for slidingly engaging shouldered screws projecting from the common surface of a fourth panel 138. Panel 138 is secured to the aligned, parallel ends of panels 134, 136 and is perpendicular to panels 132, 134 and 136. In addition, prior to the securement of panels 134, 136 and 138, a panel 140 is secured parallel to panel 132 but spaced outwardly therefrom intermediate top and bottom panels 134, 136 by means of a pair of recessed pockets 30 and fasteners in the top and bottom edges of panel 140 (FIG. 22). Panel 140 may have a blackboard or other slate surface on one side or a plastic surface on the other for accepting writing from felt tip pens or the like. Panel 140 is assembled with the other panels such that the desired side is facing outwardly. Also, panel 142 is secured perpendicularly to panel 132 by a pair of spaced, recessed pockets 30 and fasteners in its rear vertical edge to the outer surface of panel 132 prior to the assembly of panels 134 and 136. Panel 138 completes the assembly and is joined to panel 132 only by panels 134 and 136. When secured on a wall, the area bounded by panels 134, 136, 138 and 142 preferably outlines a wall phone with the remainder of the unit serving a support shelving for messages, phonebooks, and the like. As with the other embodiments, none of the recessed pockets 30 or fasteners is visible after assembly and all panels are prevented from disassembly until the final panel 138 is removed. Preferably, the closed ends of the slots on the top and bottom edges of panels 132 and 140 extend in a direction away from panel 142.

In each of the assemblies 10, 70, 90, 110 and 130, at least four panels are included, three of which include joints which are mutually perpendicular to one another. The planar panels are also mutually perpendicular. Two of the panels are parallel to one another and provide the attachment for the remaining two panels which may engage one another directly but are not directly secured to one another. In each embodiment, the two panels which are parallel to one another are first secured to a third panel which is perpendicular to the two parallel panels. Thereafter, two other parallel edges of the two parallel panels are secured to a common surface of a fourth panel which itself is perpendicular to all the other three panels. The first and fourth panels are not directly secured but are secured only to the two parallel panels respectively. All of the attachments in each case are made by means of the slotted clips receiving headed screws, at least one of the screw and slotted clip being mounted on the bottom surface of each of the recessed pockets in the location described with respect to the various embodiments. In many instances, the first panel secured to the two parallel panels cannot be removed until the fourth panel attached to other surfaces of the two parallel panels is itself disassembled from the assembly. This is accomplished by positioning the slotted clips with their slot openings toward the panel which must first be disassembled whereby the other panel cannot be slid until that panel is removed, or by securing the parallel panels to opposite edges of the entrapped panel.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. A furniture unit having no visible fasteners of fastener openings after assembly and panels with side and edge surfaces secured together at joints lying in at least three mutually perpendicular planes, said unit comprising a first panel joined to spaced second and third panels which are parallel to one another but perpendicular to said first panel; said second and third panels in turn being joined to spaced side surface portions of a fourth panel which are parallel and face in the same direction, said fourth panel being perpendicular to all said first, second and third panels; said first and fourth panels being directly and separately secured only to surfaces of said second and third panels without direct attachment to one another; at least said second and third panels being secured to said first panel and thereafter joined as a subunit to said fourth panel; said first and fourth panels being joined to said second and third panels respectively by recessed fastening means for securing said panels together, each joint between said first and said second and third panels and said fourth and said second and third panels having a first portion of said recessed fastening means secured to one panel and receiving a second portion thereof which is secured to an opposite panel; at least one of the abutting joint surfaces at each of the joints being a panel edge surface and including a recessed pocket which opens only to its edge surface and not to another surface of the respective panel; one of said first and second portions of said recessed fastening means being secured to the bottom surface of each of said recessed pockets, the other of said first and second portions being secured to the panel side surface opposite each of said recessed pockets; none of said first and second portions of said recessed fasteners, nor any part of said recessed pockets being visible after assembly of said panels such that said pockets and fasteners are completely covered and hidden by portions of said panels when said first and second fastener portions are engaged and said panels are joined.

2. The furniture unit of claim 1 wherein an edge of one of said first and fourth panels abuttingly engages a side surface of the other of said first and fourth panels.

3. The furniture unit of claim 1 wherein said side surface portions of said fourth panel are portions of a common, planar surface.

4. The furniture unit of claim 1 wherein said first portion of said recessed fastening means includes a flexible, resilient, slotted clip having a section raised above the surface to which the clip is secured and means adjacent said raised section for securing said clip to said surface, said raised section including a slot having at least one open end for receiving the head of a screw therethrough and under said raised section; said second portion of said recessed fastening means including a shouldered screw having a head spaced from the surface to which said screw is secured at the end of the screw shaft whereby the resiliency of said clips urges said abutting joint surfaces tightly together when said clips and screws are engaged.

5. The furniture unit of claim 4 wherein said slotted clips on the surfaces of said second and third panels which engage said first panel are positioned with their closed ends directed away from said fourth panel; an edge surface of said first panel abuttingly engaging a surface of said fourth panel whereby said slotted clips and screws between said first and said second and third panels cannot be disconnected and said first panel cannot be disassembled from said second and third panels until said second and third panels are disassembled from said fourth panel.

6. The furniture unit of claim 4 wherein each of said slotted clips includes wedging surfaces extending along and on either side of said slot under said raised section for drawing said respective joined panels toward one another when said panels are assembled.

7. The furniture unit of claim 6 wherein at least one of said slotted clips also includes a slot having a closed end and a locking flange to retain said screw at said closed slot end when said screw is engaged with said clip.

8. The furniture unit of claim 6 wherein said slot in at least one of said clips includes a closed end and flexible, resilient slot side portions tapering to a slot portion spaced from said closed end having a minimum width slightly less than the size of said screw shaft, said slot increasing in width between said minimum width portion and said closed end, said minimum width slot portion allowing passage of said screw shaft therepast due to flexing of said side portions and acting as a lock resisting withdrawal of said screw after such passage unless a sufficiently large withdrawal force is applied to move said screw away from said closed end along said slot.

9. The furniture unit of claim 4 wherein at least one of said slotted clips is secured within one of said recessed pockets with said raised section below the edge surface; one of said screws being secured to the panel side surface opposite said recessed pocket.

10. The furniture unit of claim 4 wherein at least one of said screws is secured within one of said recessed pockets with its head below the edge surface; one of said slotted clips being secured to the panel side surface opposite said recessed pocket.

11. A furniture unit having no visible fasteners or fastener openings after assembly and panels with side and edge surfaces secured together at joints lying in at least three mutually perpendicular planes, said unit comprising a first panel joined to spaced second and third panels which are parallel to one another but perpendicular to said first panel; said second and third panels in turn being joined to spaced side surface portions of a fourth panel which are parallel and face in the same direction, said fourth panel being perpendicular to all said first, second and third panels; said first and fourth panels being directly and separately secured only to surfaces of said second and third panels without direct attachment to one another; said first and fourth panels being joined to said second and third panels respectively at abutting joint surfaces, each joint between said first and said second and third panels and said fourth and said second and third panels including fastening means having a slotted clip secured to one panel and slidably receiving a screw secured to the opposite panel; at least one of the abutting joint surfaces at each of the joints being a panel edge surface and including a recessed pocket which opens only to its edge surface and not to another surface of the respective panel; one of the said slotted clip and screw in each joint being secured to the bottom surface of each of said recessed pockets, the other of the said slotted clip and screw being secured to the panel side surface opposite each of said recessed pockets; none of said slotted clips and screws nor said recessed pockets being visible after assembly of said panels such that said slotted clips, screws, and pockets are completely covered and hidden by portions of said panels when said screw is slidably received in said slotted clip and said panels are slidably joined; at least said second and third panels being secured to said first panel and thereafter joined as a subunit to said fourth panel.

12. The furniture unit of clain 11 wherein an edge of one of said first and fourth panels abuttingly engages a side surface of the other of said first and fourth panels.

13. A furniture unit having no visible fasteners or fastener openings after assembly and panels with side and edge surfaces secured together at joints lying in at least three mutually perpendicular planes, said unit comprising a first panel joined to spaced second and third panels which are parallel to one another but perpendicular to said first panel; said second and third panels in turn being joined to spaced surface portions of a fourth panel which are parallel and face in the same direction, said fourth panel being perpendicular to all said first, second and third panels; said first and fourth panels being directly and separately secured only to surfaces of said second and third panels without direct attachment to one another; said first and fourth panels being joined to said second and third panels respectively at abutting joint surfaces, each joint between said first and said second and third panels and said fourth and said second and third panels including fastening means having a slotted clip secured to one panel and slidably receiving a screw secured to the opposite panel; at least one of the abutting joint surfaces at each of the joints being a panel edge surface and including a recessed pocket which opens only to its edge surface and not to another surface of the respective panel; one of the said slotted clip and screw in each joint being secured to the bottom surface of each of said recessed pockets, the other of the said slotted clip and screw being secured to the panel surface opposite each of said recessed pockets; none of said slotted clips and screws nor said recessed pockets being visible after assembly of said panels such that said slotted clips, screws, and pockets are completely covered and hidden by portions of said panels when said screw is slidably received in said slotted clip and said panels are slidably joined; at least said second and third panels being secured to said first panel and thereafter joined as a subunit to said fourth panel; at least one of said recessed pockets with a portion of said fastening means therein being in each of two edge surfaces of each of said second and third panels, said two edge surfaces in each of said second and third panels being perpendicular to one another.

14. The furniture unit of claim 12 including a fifth panel parallel to said second and third panels and secured to mutually perpendicular edges of said first and fourth panels, each of said mutually perpendicular edges of said first and fourth panels including at least one of said recessed pockets with a portion of said fastening means therein.

15. The furniture unit of claim 14 including a sixth panel secured to said second, third and fifth panels such that it is parallel to but spaced from said fourth panel and perpendicular to said first, second, third and fifth panels; one edge surface of said sixth panel and one other edge of both said second and third panels including at least one of said recessed pockets with a portion of said fastening means therein.

16. The furniture unit of claim 15 including a seventh panel hingedly secured to an edge surface of said fifth panel which is not secured to any other panel, said seventh panel being movable between various positions; said fourth and sixth panels including parallel, aligned edges adapted to support said seventh panel in one position.

17. The furniture unit of claim 12 including a fifth panel secured and perpendicular to said second and third panels and parallel to said fourth panel; a sixth panel secured to said fifth and first panels and parallel to said second and third panels and perpendicular to said first, third and fourth panels; and a seventh panel secured to said third and sixth panels and parallel to said fourth and fifth panels but perpendicular to said first, second, third, and sixth panels; other edges of said second and third panels, one edge surface of said fifth panel and three separate edges of said sixth panel all including at least one of said recessed pockets with a portion of said fastening means therein.

18. A furniture unit having no visible fasteners or fastener openings after assembly and panels with side and edge surfaces secured together at joints lying in at least three mutually perpendicular planes, said unit comprising a first panel joined to spaced second and third panels which are parallel to one another but perpendicular to said first panel; said second and third panels in turn being joined to spaced surface portions of a fourth panel which are parallel and face in the same direction, said fourth panel being perpendicular to all said first, second and third panels; said first and fourth panels being directly and separately secured only to surfaces of said second and third panels without direct attachment to one another; said first and fourth panels being joined to said second and third panels respectively at abutting joint surfaces, each joint between said first and said second and third panels and said fourth and said second and third panels including fastening means having a slotted clip secured to one panel and slidably receiving a screw secured to the opposite panel; at least one of the abutting joint surfaces at each of the joints being a panel edge surface and including a recessed pocket which opens only to its edge surface and not to another surface of the respective panel; one of the said slotted clip and screw in each joint being secured to the bottom surface of each of said recessed pockets, the other of the said slotted clip and screw being secured to the panel surface opposite each of said recessed pockets; none of said slotted clips and screws nor said recessed pockets being visible after assembly of said panels such that said slotted clips, screws, and pockets are completely covered and hidden by portions of said panels when said screw is slidably received in said slotted clip and said panels are slidably joined; at least said second and third panels being secured to said first panel and thereafter joined as a subunit to said fourth panel; at least one of said recessed pockets with a portion of said fastening means therein being in each of two parallel edge surfaces of said second and third panels; at least one of said recessed pockets being in another edge surface of said second panel which is perpendicular to the said edge surface of said second panel including one of said pockets; and one edge surface of said first panel, which abuttingly engages said third panel and is parallel to said other edge surface of said second panel, including at least one of said recessed pockets.

19. The furniture unit of claim 13 including a fifth panel secured and perpendicular to said first and fourth panels and parallel to said second and third panels; one edge surface of said fifth panel and another edge surface of said fourth panel including at least one of said recessed pockets with a portion of said fastening means therein.

20. A furniture unit having no visible fasteners or fastener openings after assembly and panels with side and edge surfaces secured together at joints lying in at least three mutually perpendicular planes, said unit comprising a first panel joined to spaced second and third panels which are parallel to one another but perpendicular to said first panel; said second and third panels in turn being joined to spaced surface portions of a fourth panel which are parallel and face in the direction, said fourth panel being perpendicular to all said first, second and third panels; said first and fourth panels being directly and separately secured only to surfaces of said second and third panels without direct attachment to one another; said first and fourth panels being joined to said second and third panels respectively at abutting joint surfaces, each joint between said first and said second and third panels and said fourth and said second and third panels including fastening means having a slotted clip secured to one panel and slidably receiving a screw secured to the opposite panel; at least one of the abutting joint surfaces at each of the joints being a panel edge surface and including a recessed pocket which opens only to its edge surface and not to another surface of the respective panel; one of the said slotted clip and screw in each joint being secured to the bottom surface of each of said recessed pockets, the other of the said slotted clip and screw being secured to the panel surface opposite each of said recessed pockets; none of said slotted clips and screws nor said recessed pockets being visible after assembly of said panels such that said slotted clips, screws, and pockets are completely covered and hidden by portions of said panels when said screw is slidably received in said slotted clip and said panels are slidably joined; at least said second and third panels being secured to said first panel and thereafter joined as a subunit to said fourth panel; at least one of said recessed pockets with a portion of said fastening means therein being in each of two, spaced parallel edge surfaces of said first panel; at least one of said recessed pockets with a portion of said fastening means therein being in an edge surface of each of said second and third panels, the said edge surfaces of said second and third panels being perpendicular to said first panel.

21. The furniture unit of claim 19 including a fifth panel secured intermediate and perpendicular to said second and third panels, perpendicular to said fourth panel, and parallel to said first panel; a sixth panel secured to said first panel and parallel to but spaced from said fourth panel and perpendicular to said first, second, third and fifth panels; each of two spaced, parallel edge surfaces of said fifth panel and one edge surface of said sixth panel including at least one of said recessed pockets with a portion of said fastening means therein.

22. A method for assembling a furniture unit having no visible fasteners after assembly and at least four panels having side and edge surfaces, at least three of which panels are mutually perpendicular, wherein two of the panels are connected to one another only by means of the two other panels, said method comprising the steps of:

(1) securing a surface portion of a first panel in engagement with a surface of a second panel which is perpendicular to said first panel surface portion, at least one of said surfaces being an edge surface and including at least one recessed pocket therein opening only to said edge surface for receiving and securing therein one of a connecting clip having a raised, slotted section and a shouldered screw, the other of said surfaces which is opposite said recessed pocket having the remaining one of said clip and screw secured thereto, said securing including sliding said screw into engagement with the slot of said clip within said recess such that said panel surfaces are drawn together and said pocket, clip and screw are hidden;

(2) securing a surface of a third panel to another surface portion of said first panel such that said third panel is parallel to and spaced from said second panel and perpendicular to said first panel using at least one slotted clip and shouldered screw in the same manner as said first and second panels such that the pocket, clip and screw between said first and third panels are hidden after connection; and (3) securing the subassembly of at least said first, second and third panels into engagement with spaced side surface portions of a fourth panel which are parallel and face in the same direction while connecting only said second and third panels directly with said fourth panel using others of said slotted clips and shouldered screws without directly attaching said first and fourth panels to one another by sliding surfaces of said second and third panel together in the same direction into engagement with said fourth panel side surface portions such that no pockets, clips or screws are visible after assembly, at least one of the engaging surfaces between said fourth panel and each of said second and third panels having at least one recessed pocket in which is secured one of said clips and shouldered screws, the other of said clips and shouldered screws being secured to the surface opposite said pocket for engagement with the said one of said clips and screws.

23. The method of claim 22 including sliding said surfaces of said second and third panels into engagement with a common surface of said first panel to connect said clips and screws.

24. The method of claim 22 including securing at least one additional panel to parallel surfaces of said second and third panels such that said additional panel is parallel to said fourth panel by sliding said additional panel in one direction into engagement with and connecting to said surfaces of said second and third panels using others of said clips and shouldered screws which are also not visible after assembly.

25. The method of claim 22 including sliding said fourth panel into abutting engagement with said first panel when said second and third panels are secured to said fourth panel.

26. The method of claim 25 including slidably positioning an edge of said first panel against a surface of said fourth panel whereby said first panel cannot be disassembled from said second and third panels without disassembling said second and third panels from said fourth panel.

27. The method for assembling a furniture unit having no visible fasteners after assembly and at least four panels, at least three of which are mutually perpendicular, wherein two of the panels are connected to one another only by means of the two other panels, said method comprising the steps of:

(1) securing a surface portion of a first panel in engagement with a surface of a second panel which is perpendicular to said first panel surface portion, at least one of said surfaces being an edge surface and including at least one recessed pocket therein opening only to said edge surface for receiving and securing therein one of a connecting clip having a raised, slotted section and a shouldered screw, the other of said surfaces which is opposite said recessed pocket having the remaining one of said clip and screw secured thereto, said securing including sliding said screw into engagement with the slot of said clip within said recess such that said panel surfaces are drawn together and said pocket, clip and screw are hidden;

(2) securing a surface of a third panel to another surface portion of said first panel such that said third panel is parallel to and spaced from said second panel and perpendicular to said first panel using at least one slotted clip and shouldered screw in the same manner as said first and second panels such that the pocket, clip and screw between said first and third panels are hidden after connection;

(3) securing the subassembly of at least said first, second and third panels into engagement with spaced surface portions of a fourth panel which are parallel and face in the same direction while connecting only said second and third panels directly with said fourth panel using others of said slotted clips and shouldered screws by sliding surfaces of said second and third panel together in the same direction into engagement with said fourth panel surface portions such that no pockets, clips or screws are visible after assembly, at least one of the engaging surfaces between said fourth panel and each of said second and third panels having at least one recessed pocket in which is secured one of said clips and shouldered screws, the other of said clips and shouldered screws being secured to the surface opposite said pocket for engagement with the said one of said clips and screws; and (4) securing a surface of a fifth panel into engagement with a surface of said first panel prior to securement of said fourth panel by slidingly engaging others of said clips and screws extending between said first and fifth panels such that said fifth panel is parallel to said second and third panels but perpendicular to said first panel and no pockets, clips or screws between the joined panels are visible after assembly; said fourth panel being secured to said fifth panel by sliding engagement using others of said clips and screws extending between said fourth and fifth panels simultaneously when said fourth panel is secured to said second and third panels.

28. A method for assembling a furniture unit having no visible fasteners after assembly and at least four panels having side and edge surfaces, at least three of which panels are mutually perpendicular, wherein two of the panels are connected to one another only by means of the two other panels, said method comprising the steps of:

(1) securing a surface portion of a first panel in engagement with a surface of a second panel which is perpendicular to said first panel surface portion, at least one of said surfaces being an edge surface and including at least one recessed pocket therein opening only to said edge surface for receiving and securing therein a recessed fastener, the other of said surfaces opposite said recessed pocket having a projecting fastener for mating engagement with said recessed fastener, said securing including engaging said fasteners such that said panel surfaces are drawn together and said pocket and fasteners are hidden;

(2) securing a surface of a third panel to another surface portion of said first panel such that said third panel is parallel to and spaced from said second panel and perpendicular to said first panel using recessed and projecting fasteners in the same manner as said first and second panels such that the pocket and fasteners between said first and third panels are hidden after connection; and (3) securing the subassembly of at least said first, second and third panels into engagement with spaced, side surface portions of a fourth panel which are parallel to one another and face in the same direction while connecting only said second and third panels directly with said fourth panel using others of said recessed fasteners in recessed pockets opening only to one surface without directly attaching said first and fourth panels to one another by engaging surfaces of said second and third panels with said fourth panel side surface portions and connecting said fasteners without distortion or bending of said panels such that no pockets or fasteners are visible after assembly.

* * * * *

UNITED STATES PATENT AND TRADEMARK OFFICE
CERTIFICATE OF CORRECTION

PATENT NO. : 4,178,047
DATED : December 11, 1979
INVENTOR(S) : Montgomery J. Welch It is certified that error appears in the above-identified patent and that said Letters Patent are hereby corrected as shown below:

Column 4, line 37:

"panels" should be --- panel ---

Column 11, line 8:

"clain" should be --- claim ---

Column 13, line 12:

"the direction" should be --- the same direction ---

Column 15, line 26:

"whieh" should be --- which ---

Signed and Sealed this

Eighth Day of July 1980

[SEAL]

Attest:

SIDNEY A. DIAMOND

Attesting Officer  Commissioner of Patents and Trademarks